United States Patent
Moore

(10) Patent No.: US 9,424,027 B2
(45) Date of Patent: Aug. 23, 2016

(54) MESSAGE MANAGEMENT SYSTEM FOR INFORMATION TRANSFER WITHIN A MULTITASKING SYSTEM

(71) Applicant: Ralph Moore, Costa Mesa, CA (US)

(72) Inventor: Ralph Moore, Costa Mesa, CA (US)

( * ) Notice: Subject to any disclaimer, the term of this patent is extended or adjusted under 35 U.S.C. 154(b) by 0 days.

(21) Appl. No.: 14/446,006

(22) Filed: Jul. 29, 2014

(65) Prior Publication Data

US 2015/0032986 A1    Jan. 29, 2015

Related U.S. Application Data

(60) Provisional application No. 61/859,399, filed on Jul. 29, 2013.

(51) Int. Cl.
*G06F 12/00* (2006.01)
*G06F 9/00* (2006.01)
*G06F 3/06* (2006.01)

(52) U.S. Cl.
CPC ......... *G06F 9/00* (2013.01); *G06F 2003/0695* (2013.01)

(58) Field of Classification Search
CPC .... G06F 12/023; G06F 3/067; G06F 3/0608; G06F 9/5016; G06F 3/0631
USPC ........................................................ 711/171
See application file for complete search history.

(56) References Cited

U.S. PATENT DOCUMENTS

| | | | |
|---|---|---|---|
| 5,233,701 A | 8/1993 | Nakata | |
| 5,491,808 A | 2/1996 | Geist, Jr. | |
| 5,835,959 A | 11/1998 | McCool et al. | |
| 6,338,079 B1 * | 1/2002 | Kanamori et al. | 718/104 |
| 6,718,451 B2 | 4/2004 | Lawton et al. | |
| 7,171,469 B2 * | 1/2007 | Ackaouy | H04L 67/2852 707/999.01 |
| 7,181,585 B2 | 2/2007 | Abrashkevich et al. | |
| 7,587,566 B2 | 9/2009 | Ballantyne et al. | |
| 7,627,023 B1 * | 12/2009 | Lo | 375/222 |
| 7,707,600 B1 * | 4/2010 | Ramanathan | H04H 20/12 348/432.1 |
| 7,827,373 B2 | 11/2010 | Kaakani et al. | |
| 7,827,375 B2 | 11/2010 | Abrashkevich et al. | |
| 8,429,354 B2 | 4/2013 | Kodaka | |
| 8,626,993 B2 | 1/2014 | Vaishampayan et al. | |
| 2001/0052120 A1 * | 12/2001 | Babaian et al. | 717/9 |
| 2003/0212808 A1 * | 11/2003 | Chen | 709/230 |
| 2004/0039895 A1 * | 2/2004 | Wolrich et al. | 712/200 |
| 2005/0154851 A1 * | 7/2005 | Charles | 711/170 |
| 2006/0123216 A1 * | 6/2006 | Krauss et al. | 711/171 |
| 2007/0076478 A1 | 4/2007 | Sanders | |
| 2007/0247936 A1 | 10/2007 | Direnzo et al. | |
| 2008/0120627 A1 * | 5/2008 | Krauss | 719/328 |
| 2010/0199024 A1 * | 8/2010 | Jeong | 711/103 |

(Continued)

FOREIGN PATENT DOCUMENTS

| | | |
|---|---|---|
| CN | 1556475 A | 12/2004 |
| CN | 103399825 A | 11/2013 |
| WO | 2007097581 A1 | 8/2007 |

*Primary Examiner* — Charles Rones
*Assistant Examiner* — Nanci Wong

(57) ABSTRACT

This invention bridges the gap between bare-block messaging for I/O and exchange messaging for inter-task communication by providing a message make service to make exchange messages from bare-block messages during input and a message unmake service to do the opposite during output. This invention also introduces new capabilities for message broadcasting by using broadcast message exchanges and message multicasting and distributed message assembly by using proxy messages.

9 Claims, 6 Drawing Sheets

(56) References Cited

U.S. PATENT DOCUMENTS

| | | | | |
|---|---|---|---|---|
| 2010/0332446 A1* | 12/2010 | Ahrens | ............ | G06F 17/30067 707/609 |
| 2011/0246727 A1* | 10/2011 | Dice et al. | .................... | 711/150 |
| 2012/0144187 A1* | 6/2012 | Wei et al. | ..................... | 713/152 |
| 2012/0151125 A1* | 6/2012 | Yang | .............................. | 711/103 |
| 2012/0246544 A1* | 9/2012 | Resnick et al. | ................ | 714/764 |
| 2012/0296986 A1* | 11/2012 | Hassan et al. | ................ | 709/206 |
| 2012/0303927 A1* | 11/2012 | Goldberg | ...................... | 711/171 |
| 2014/0173226 A1* | 6/2014 | Gold | ............................ | 711/159 |
| 2014/0372725 A1* | 12/2014 | Almasi et al. | ................ | 711/173 |

* cited by examiner

MESSAGE MANAGEMENT SYSTEM FOR INFORMATION TRANSFER WITHIN A MULTITASKING SYSTEM

This application claims priority to U.S. Application 61/859,399, filed Jul. 29, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is operating system technologies.

BACKGROUND

The following description includes information that may be useful in understanding the present invention. It is not an admission that any of the information provided herein is prior art or relevant to the presently claimed invention, or that any publication specifically or implicitly referenced is prior art.

In real-time operating systems (RTOSs), memory management is extremely important. An RTOS that runs on a computer system must be able to quickly access memory (e.g., to allocate/deallocate memory for processes). The memory is usually organized by the RTOS into pools. Each memory pool typically has fixed-size memory blocks, and memory blocks from one pool can differ in size from memory blocks of a second pool. It is crucial that the RTOS has strict control over managing the memory pools to ensure that the memory blocks are returned to their proper pool when they are deallocated, especially when the memory blocks are allocated to a complex application that has different processes in different layers (e.g., networking layers) accessing data in the same memory blocks. An undue burden is placed on the application developer to keep track of memory pools. If a block is released to the wrong pool, the computer system could be exposed to risk, and the system could crash or suffer memory corruption.

Ideally, a memory block could be released at any point during the running of an application (by any sub-processes within the application), regardless of its pool of origin, without requiring an application programmer to maintain pool origin information.

A great deal of effort has been directed to memory management functions within general purpose operating systems. For example, U.S. Pat. No. 8,429,354 to Kodaka titled "Fixed Length Memory Block Management Apparatus and Method for Enhancing Memory Usability and Processing Efficiency", filed Jan. 23, 2009, describes an apparatus capable of providing fixed length memory blocks to various processors in a system where the processors share the memory. Unfortunately, such an approach has little value within a deeply embedded system with little resources.

Additional efforts have been applied toward managing memory pools within embedded systems. U.S. Pat. No. 6,718,451 to Lawton et al. titled "Utilizing Overhead in Fixed Length Memory Block Pools", filed Jan. 31, 2002, describes managing fixed length memory block pools having many memory blocks. Lawton merely discloses returning a pointer to the memory block that preserves an overhead area within the block. Although useful when constructing chains of blocks, Lawton fails to provide insight into how to return of block to the proper pool.

Further progress is made by International patent application publication WO 2007/09758 to Kim et al. titled "Method and System for Efficiently Managing Dynamic Memory in Embedded System", filed Feb. 23, 2007. Kim provides for managing different sized memory blocks by registering with hash tables. Such an approach for managing blocks is useful, but requires management overhead with respect to hash tables, which can be too slow for low-end embedded systems.

U.S. Pat. No. 7,827,373 to Kaakani et al. titled "System and Method for Managing a Short-Term Heap Memory", filed Oct. 31, 2005, discloses a method of allocating and de-allocating memory blocks more rapidly by using a pointer that identifies a start location of unallocated memory. U.S. Pat. No. 7,587,566 to Ballantyne et al. titled "Realtime Memory Management via Locking Realtime Threads and Related Data Structures", filed Sep. 21, 2004, discloses a method for minimizing memory access latency during real-time processing by enabling the creation of heaps. The heap supports allocating and freeing memory in a non-blocking fashion.

Other efforts made in this field are described in CN 1556475 issued to Zhong Xing, CN 103399825 issued to Zhao, U.S. Pat. No. 5,491,808 issued to Geist, Jr., and U.S. Pat. No. 8,626,993 issued to Vaishampayan et al. Unfortunately, the previously known efforts do not appear to disclose a specific mechanism of allocating and deallocating blocks in an efficient and reliable manner.

Thus, there is still a need for improved memory management technologies to better ensure memory integrity while maintaining access efficiency.

SUMMARY OF THE INVENTION

The inventive subject matter provides apparatus, systems and methods in which an operating system enables different processes to migrate an allocated memory block from one type of block to another type of block and to reliably release the block back to its correct pool of origin. According to one aspect of the inventive subject matter, a memory management engine is programmed to manage memory for processes that runs on top of an operating system. The memory management engine organizes physical memory that is available for the operating system into memory pools. Each memory pool includes multiple memory blocks that have characteristics (e.g., block size) that are distinctive from memory blocks from other pools.

Upon receiving a memory allocation request, the memory management engine allocates memory blocks from a particular pool with characteristics that match the memory requirements specified in the memory allocation request. Regardless of which pool the memory block comes from, the memory block can be allocated according to one of many different types of blocks. For example, the memory management engine can allocate a memory block in a basic block type (a bare block type), meaning that the memory block does not include any metadata associated with the block. When a memory block is allocated according to this basic block type, the memory management engine relies on the processes that access the memory block to keep track of the information about its pool of origin. As mentioned before, the memory block can be accessed by more than one process to perform a task. When the task is complete, the last process that accesses the memory block is required to make a memory de-allocation request to the memory management engine, and within the request specifies the pool of origin information so that the memory management engine can safely de-allocate the memory block (i.e., return the block back to its pool of origin).

Alternatively, the memory management engine can also allocate a memory block in a message control block type, meaning that the memory block is associated with metadata that indicates the address of the memory block and also information about the memory pool from which the memory block was allocated (i.e., the pool of origin). Allocating a memory block according to the message control block type is beneficial because the memory block itself includes sufficient information to enable the memory management engine to safely de-allocate the memory block (i.e., returning the block back to its pool of origin) upon request by a process. In other words, the memory management engine needs not rely on the process that initiates a memory de-allocation request to supply the information about the pool of origin. This is especially useful when the memory block is passed around among multiple different processes (e.g., via an exchange), and without the pool of origin information associated with the memory block, the memory management engine can only rely on the process that makes the memory block de-allocation request to supply such information. However, the drawback for allocating a memory block according to the message control type is that the time it takes for the memory management engine to allocate a memory block according to the message control type is substantially longer than the time it takes to allocate a memory block according to the basic block type. As such, this might not be feasible in certain circumstances (such as a request by an interrupt).

Thus, in some of these embodiments, the memory management engine can initialize a memory block according to a first block type that requires very little processing time to allocate (e.g., a basic block type) upon a memory allocation request made by a first process, and then migrate the memory block from the first type of block to a different, second type of block that is associated with information about its pool of origin (e.g., a message control block type) upon a block migration request made by a different process. The memory block can be accessed by different processes (i.e., passing around among the different processes). For example, the memory block can be placed at an exchange (e.g., a task synchronization point, a rendezvous point, a semaphore, a pipe, a listener, etc.) where multiple processes can access the memory block. Because the memory block has been migrated to a type of block that is associated with pool of origin information, the processes that access the memory block no longer need to keep track of the pool of origin information. Yet, when the task is complete and the last process that accesses the memory block makes a memory de-allocation request, the memory management engine can safely de-allocate the memory block with the information associated with the block, without relying on the processes.

Viewed from a different perspective, a memory management system of the inventive subject matter can include a first memory storing one or more memory block pools, a second memory storing operating system memory management instructions, and a processor programmed to execute the memory management instructions of the operating system. The processor can execute the instructions to obtain one or more memory blocks from a target memory pool where the memory block is initialized according to a type (e.g., message block, base block, heap block, etc.) based on a memory allocation request (e.g., a message get request, block get request, or malloc, etc.). The memory allocation request can be made by a process of a lower layer (e.g., data link layer) of an OSI communication stack. The processor can further execute instructions that allow a process of a different layer (e.g., a network layer) in the OSI communication stack to migrate the memory block from its initial type to a different type of memory block via a block migration request (e.g., a block make request). The processor can reliably release the memory block back to its original memory pool upon calling a memory deallocation request (e.g., a block release request) associated with the second type of memory block. The steps of migrating the memory block and releasing the memory block can optionally be accomplished without copying contents of the memory block.

In some aspects of the inventive subject matter, the processor can additionally or alternatively be programmed to execute OS memory management instructions of releasing the memory block in at least one of an interrupt safe manner and a task safe manner. Additionally or alternatively, the processor can be programmed to execute instructions of placing the memory block at an exchange (e.g., a task synchronization point, a rendezvous point, a semaphore, a pipe, a listener, etc.) after initialization of the memory block. Additionally or alternatively, the processor can be programmed to execute the instructions of releasing the memory block to its correct memory pool in response to a request associated with the second type of memory block, and independent of its type or requesting or calling layer (e.g., an interrupt service routine, an operating system layer, a device driver layer, a physical layer, a link layer, a network layer, a transport layer, a session layer, a presentation layer, a protocol layer, a software application layer, etc.).

In other aspects of the inventive subject matter, it is contemplated that memory block pools can comprise any suitable type(s) of memory block pools (e.g., a base block pool, a standard block pool, a message pool, etc.). Additionally, contemplated memory blocks comprise fixed or variable sized memory blocks, and each of the first and second types of memory blocks can comprise any suitable type(s) of memory blocks (e.g., a bare block type, a base block type, a a standard block type, a static block type, a heap block type, a message block type, etc.).

In some preferred embodiments, the first type of memory block lack a control block portion (e.g., a bare block type) while the second type of memory block comprises the control block portion (e.g., a message control block type).

Where the second type of memory block comprises a proxy message block type, it is contemplated that the processor could be programmed to execute the instruction of transmitting the memory block as a proxy message to multiple tasks (e.g., by multicasting the proxy message). Additionally or alternatively, the processor could be programmed to execute the instruction of releasing the memory block as a proxy message while retaining a message body of the proxy message.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
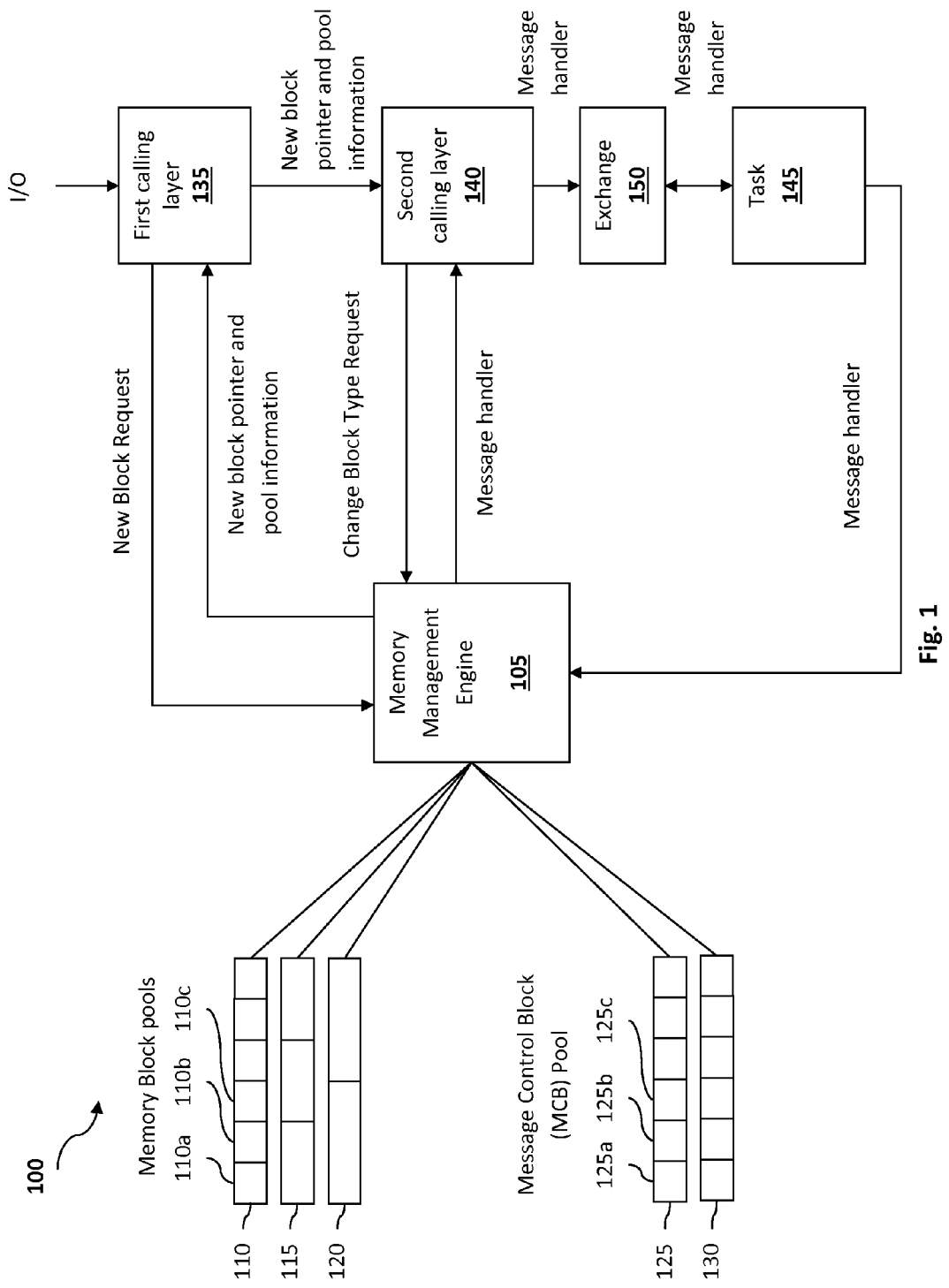
FIG. 1 shows an embodiment of the present invention for allocating and deallocating memory.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One should appreciate that the disclosed techniques provide many advantageous technical effects including providing systems and methods that allocate and deallocate memory blocks reliably to their pools of origin.

The inventive subject matter provides apparatus, systems and methods in which an operating system enables different processes (e.g., software routines, tasks, software processes, etc.) to migrate an allocated memory block from one type of block to another type of block and to reliably release the block back to its correct pool of origin. According to one aspect of the inventive subject matter, a memory management engine is programmed to manage memory for processes that runs on top of an operating system. The memory management engine organizes physical memory that is available for the operating system into memory pools. Each memory pool includes multiple memory blocks that have characteristics (e.g., block size) that are distinctive from memory blocks from other pools.

Upon receiving a memory allocation request, the memory management engine allocates memory blocks from a particular pool with characteristics that match the memory requirements specified in the memory allocation request. Regardless of which pool the memory block comes from, the memory block can be allocated according to one of many different types of blocks. For example, the memory management engine can allocate a memory block in a basic memory type (a bare block type) as described above and not including metadata associated with the block Alternatively or additionally, the memory management engine can allocate a memory block in a message type (or a message block type), meaning that the memory block is associated with metadata that indicates the address of the memory block and also information about the memory pool from which the memory block was allocated such that the memory block itself includes sufficient information to enable the memory management engine to safely de-allocate the memory block upon request by a process. In other words, the memory management engine needs not rely on the process that initiates a memory de-allocation request to supply the information about the pool of origin. However, the drawback for allocating a memory block according to the message control type is that the time it takes for the memory management engine to allocate a memory block according to the message control type is substantially longer than the time it takes to allocate a memory block according to the basic block type. As such, this might not be feasible in certain circumstances (such as a request by an interrupt).

Thus, in some of these embodiments, the memory management engine can initialize a memory block according to a first block type that requires very little processing time to allocate (e.g., a basic memory type) upon a memory allocation request made by a first process, and then migrate the memory block from the first type of block to a different, second type of block that is associated with information about its pool of origin (e.g., a message control block type) upon a block migration request made by a different process. The memory block can be accessed by different processes (i.e., passing around among the different processes). For example, the memory block can be placed at an exchange (e.g., a task synchronization point, a rendezvous point, a semaphore, a pipe, a listener, etc.) where multiple processes can access the memory block. Because the memory block has been migrated to a type of block that is associated with pool of origin information, the processes that access the memory block no longer need to keep track of the pool of origin information. Yet, when the task is complete and the last process that accesses the memory block makes a memory de-allocation request, the memory management engine can safely de-allocate the memory block with the information associated with the block, without relying on the processes.

FIG. 1 illustrates an embodiment of a system 100 of the inventive subject matter for reliably allocating, migrating and deallocating memory as described above. The system 100 is a computing environment provided by an operating system in which different applications or processes can run. The system 100 includes a memory management engine 105 that has access to non-persistent physical memory (e.g., RAM, etc.) of one or more computing device. The memory management engine 105 can be part of an operating system or associated with an operating system. In some embodiments, the operating system is a real-time operating system. The processes that run on top of the operating system request memory allocation and de-allocation via the memory management engine 105 of the operating system. Thus, the memory management engine 105 is responsible for managing the physical memory of the computing device (e.g., allocating memory to processes that run on top of the operating system, de-allocating memory to processes that run on top of the operating system, etc.).

In this example, the memory management engine 105 divides a first portion of the physical memory of the computing device into multiple pools 110, 115, 120 of memory blocks. Each of the pools include memory blocks that have different characteristics (e.g., different sizes) from blocks of the other pools. For example, pool 110 includes memory blocks that are 512 kilobytes (KB) block size while pool 115 includes memory blocks that are 1 megabytes (MB) block size and pool 120 includes memory blocks that are 2 MB block size. These memory blocks are to be allocated for use by different processes to temporarily store data. In addition, the memory management engine 105 divides a second portion of the physical memory of the computing device into message control block pools 125 and 130. These message control blocks are to be used to store metadata for the memory blocks.

Figure 2B:
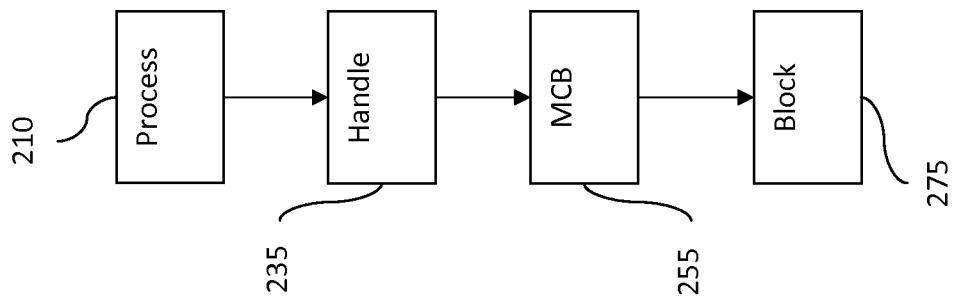
FIGS. 2A-2B show example structures of different types of memory that can be allocated to the processes.
Figure 2A:
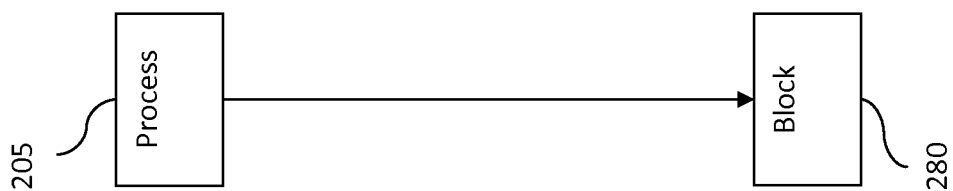

FIGS. 2A-2B show example structures of different types of memory that the memory management engine 105 can allocate to different processes. FIG. 2A shows an example structure of memory in a basic memory type. The basic memory type structure includes only a basic memory block 280 (which can be any one of the memory blocks from pools 110, 115, or 120 in FIG. 1). As shown, process 205 that is allocated with memory block 280 is directly linked to the block 280, meaning that the memory management engine 105 passes a pointer to block 280 to process 205 for accessing the memory block 280. In order to enable the memory management engine 205 to safely de-allocate the block 280 back to its own pool, the memory management engine 205 of some embodiments also passes information about the block 280's pool of origin to the process 205. However, the drawback with this basic memory type structure is that the memory management engine 105 relies on the process 205 (or any other process that initiates a de-allocation request for memory block 280) to have the right information of the block's pool of origin and passes the information back to the memory management engine 105 during the de-allocation process.

Basic blocks from base pools are freestanding data blocks. The application programming interface (API) provided data block pointers (dbps) for processes to operate on the basic blocks. A dbp is returned by BlockGet( ) (i.e., a block get request) and is used by BlockRel( ) (i.e., a block release request) to return the basic block to its pool. This provides low security because the RTOS has no ability to assure that blocks are being returned to their correct pools or even that dbps point to a valid blocks. However base blocks are essential for use in interrupt service routines (ISRs) and drivers, where very high performance is required.

Blocks from standard block pools consist of data blocks linked to block control blocks (BCBs). These blocks provide a safer API. BlockGet( ) returns a handle, which is a pointer to the block's BCB. BlockRel( ) accepts a handle. The BCB, at a minimum, consists of dbp, a pointer to the pool control block (PCB), and an owner handle, which usually points to a task control block (TCB). As such, the RTOS can guarantee that a block is returned to the correct pool and that blocks owned by a task will be released if the task is deleted.

Messages from message pools consist of data blocks linked to message control blocks (MCBs). Messages, like blocks, provide a safer API and they also can be sent to "exchanges" (see Message Broadcasting, below, for an explanation exchanges) where they wait for tasks or tasks wait for them. Messages are important in implementing client-server algorithms and providing task isolation. MCBs have the same fields as BCBs plus additional fields.

FIG. 2B shows an example structure of memory in a message type. The message type structure includes a basic memory bock 275, a message control block 255 that is linked to the basic memory block 275, and a handle 235 (e.g., a pointer) that points to the message control block 255. When the memory management engine 105 allocates memory in this message type, the memory management engine 105 first allocates a basic block 275 from one of the pools 110, 115, and 120. The memory management engine 105 also allocates a message control block 255 from one of the MCB pools 125 and 130, and linked the message control block 255 to the basic block 275. The linking can be done by storing a pointer to the basic memory block 275 in the message control block 255. In some embodiments, the memory management engine 105 also stores information about the pool to which the basic memory block 275 belongs (pool of origin) in the message control block 255 to ensure proper de-allocation of the memory block 275. The memory management engine 105 then passes the handle 235 to the process 210.

Referring back to FIG. 1, when an event that requires both immediate attention and storage of data has occurred (e.g., a data packet has arrived at the computing system's network card, etc.), a process 135 (e.g., an interrupt routine) can send a memory allocation request to memory management engine 105. An interrupt routine 135 is one that requires immediate attention such that the operating system has to halt attending to other processes to allocate memory to the interrupt routine 135. Because most of the other processes that requires attention from the operating system are also time sesntive, the operating system must allocate the memory for the interrupt routine 135 in a very efficient manner.

As such, the memory management engine 105 allocates a memory in the basic memory type for the interrupt routine to save time. First, the memory management engine 105 determines a proper memory block pool from pools 110 115, and 120 that have memory blocks that would satisfy the requirement requirements specified in the request (e.g., the memory block having a size sufficient to satisfiy the request). The memory management engine 105 can then allocate a free memory block from that pool (a free memory block means a memory block that has not been allocated to any processes) and send a pointer of the free memory block and pool information that indicates the pool from which the block was allocated to the process 135. For example, the memory management engine can determines that pool 110 can satisfy the size requirement of the request, and allocates a free block 110a for the interrupt routine 135 (by sending a pointer that points to 110a to interrupt routine 135). The interrupt routine 135 can then fill the memory block incoming data (e.g. an IP datagram) using the pointer.

In a situation that deals with networking data such as the one in this example, different processes (and usually processes from different networking layers from the OSI model) are required to access the data before the process is complete. However, requiring the processes to pass not only the memory block pointer and the pool of origin information can be problematic as described above. Thus, in some embodiments, the memory management engine 105 allows the interrupt routine 135 or another process that is different from the interrupt routine 135 (such as process 140) to request changing the type of the memory after the memory was allocated to the interrupt routine 135. In some embodiments, the process 140 can belong to a different layer from the layer of the interrupt routine 135. For example, the interrupt routine can belong to the data link layer while the process 140 can be a process from the transport layer or any other layer on top of the data link layer.

When the interrupt routine 135 or the process 140 requests for a change of memory type, the memory management engine 105 changes the memory type from the basic memory type to the message type. A memory in the message type includes a message control block that is linked to a bare memory block. In some embodiments, the memory management engine 105 can change the memory type by initiating a message control block (e.g., message control block 125a from the MCB pool 125) and associating the message control block to the memory block 110a that was allocated to the interrupt routine 135. The association can be made by storing the pointer to the memory block 110a and information that indicates the pool to which the memory block 110a belongs (e.g., pool 110 in this example) in the message control block 125a. The memory management engine 105 then passes a handler to the message control block 125a to the process that requests the change of memory type. The memory type of the memory that is made available to the requesting process is now a message type instead of a bare memory type.

As mentioned above, the message type of memory enables a reliable return of the memory block 110a to its pool of origin even when the memory block 110a is being accessed by multiple different processes that belong to different layers. The message typed memory can advantageously provide a safer API, and can be sent to "exchanges" where they wait for tasks or tasks wait for them. Messages can be important in implementing client-server algorithms and providing task isolation. A message control block can comprise data such as a pointer to the memory block, a pointer to the memory block pool where the associated basic block type memory block originates, a handle to the MCB, and an owner handle, which usually points to a task control block (TCB). As such, the RTOS can guarantee that a block is returned to the correct pool and that blocks owned by a task will be released if the task is deleted. A task control block (TCB) contains information about a task, which is needed by the RTOS to manage the task. For, example a TCB contains a pointer to the main code for the task, it contains the stack pointer for the task, and it contains the task's priority.

Viewed from a different perspective, memory management engine 105 can retrieve a handle that is associated with a message control block 125a from MCB pool 125, and send the handle to the process 140 and enables the process 140 access memory block 110a. The process 140 can then send the message handle to exchange 150 to allow multiple processes (e.g., processes 145, etc.) to access the memory block 110a associated with the handle. As illustrated, process 145 sends a request for the message handle to exchange 150, and exchange 150 sends the message handle to task 145. The receiving process may send a message on to other processes for further processing, such as different processes in a TCP/IP stack. Additionally or alternatively, an exchange or task could broadcast the message to many tasks, or could multicast proxies of a message to other tasks as further described below. Once the last task has completed use of the memory block 110a, the message handle can be sent to memory management engine 105, which can reliably de-allocate memory block 110a back to memory block pool 110 by using the information that indicates the pool of origin stored in the memory control block 125a, and send memory control block 125a back to message control block pool 125.

An exchange is an object that can have either a message queue or a task queue, depending upon which is waiting for which. Messages can be exchanged by passing their handles, which are actually pointers to their MCBs. When a message is passed to a task, its MCB is removed from the exchange and assigned to the task. Exchanges can be of two types: normal and priority pass. A priority pass exchange passes the message priority on to the receiving task, as well as its handle.

The inventive subject matter is considered to include the addition of a broadcast exchange. A broadcast exchange can be programmed to accept only one message at a time and the message is "sticky" (i.e. the message is not transferred to the receiving task). Instead, it sticks to the exchange and the receiver gets only its handle and the pointer to the message body (i.e. the memory block containing the actual message.). Furthermore, the task queue can be a FIFO (i.e. non-priority) queue. As a consequence, when a message is sent to the exchange, all waiting tasks can get the message handle and message body pointer and can be resumed, at once. Any subsequent task receiving from the broadcast exchange can also get the message handle and the message body pointer and will continue running (i.e. will not wait at the exchange.).

All receiving tasks, which will be called slave tasks, herein, have access to one message's MCB and its message body. Normally, slave tasks will only read broadcast messages, not modify them. However, a slave could be assigned a section of the message body that it is permitted to alter. This fosters what can be called "distributed message assembly".

The single task which sends the message will be called the master task, herein. Unlike a request to send a message to a normal or pass exchange, the master task remains the message owner. Hence, the master task maintains access to the broadcast message. When all slaves have signaled completion, possibly via another RTOS communication service (e.g., a semaphore), the master task can be programmed to do one of multiple things, including, for example: releasing the message back to its pool, changing the message body and resending it to the broadcast exchange, which effectively results in new information being broadcast, and sending a message assembled by the slave tasks to another exchange.

Interlocking of tasks may be necessary to assure that all intended tasks receive a broadcast message and that no tasks receive it more than once. For example, after sending the message, the master task can wait at a threshold semaphore (semT), which can be set to the expected number of slave task readers. As each slave task finishes with the message, it can signal a threshold semaphore (semT) and wait at a gate semaphore (semG). The threshold semaphore (semT) can reach its threshold when all slave tasks are done, and wakes up the master task. The master task can perform one of the above operations, and then signal the gate semaphore (semG) to thereby permit the slave tasks to come to the broadcast exchange for the next message.

It is contemplated that multiple broadcast masters (broadcasters) can send a message or messages to a normal exchange that is serviced by a single master task, which can perform the actual broadcasting. The normal exchange can prioritize messages, and messages can accumulate, for example, because the exchange has a priority message queue. MCBs can include a reply handle so that the master task can tell a broadcaster when its message has been broadcast (e.g., by signaling semaphore at which the broadcaster waits).

A broadcast exchange is a new type of message exchange, which provides the ability to transfer information simultaneously to many receiving tasks without copying the information. This feature is closely related to the previously described feature of making and unmaking messages from a first type of memory block (e.g., a memory block with data input by a first calling layer, sometimes referred to herein as a data block). In this case, the MCB is sent ahead while the message body (or data block) is left behind with the broadcaster. Thus slave tasks are able to at least one of view and modify portions of the message body, while control of the message remains with the master task, which broadcast it, and which remains its owner.

In another aspect of the inventive subject matter, it is contemplated that multiple messages can share a single message block, wherein a first message is referred to as the real message and additional messages are referred to as "proxy messages" because they represent, but are not, real messages. The operation can proceed as follows: a request can be used to retrieve a real message from a message pool; data can be loaded into a message body; and another request can be used one or more times to make multiple proxies of the real message. For example, a MsgGet( ) can be used to retrieve a real message from its pool; data can be loaded into the message body; then MsgMake (NULL, msg->dbp) can be used multiple times to make multiple proxies of the real message, msg. In this example, the NULL parameter is used because a proxy message has no pool; the parameter msg->dbp points at the message body.

After n calls are made to make proxies of the real message, there will be one real message and n proxies of it. The proxies can be sent to other exchanges where server tasks wait. This process is referred to as "multicasting" to distinguish it from broadcasting, which was discussed above. Multicasting is more selective than broadcasting because the proxies are sent to specific exchanges where specific types of tasks are expected to be waiting.

For distributed message assembly, the task that sends the message for multicasting is referenced as the "client task" in order to be consistent with the client/server paradigm. Using proxy tasks may be more suitable for distributed message assembly than is broadcasting. The client can get an empty message, then create and send proxies out to a plurality of server exchanges with different message body pointers. For example, a protocol header task could receive a header pointer, whereas a data task would receive a data payload pointer. There might be several such data payload pointers, for example, one for each kind of data (e.g. temperature, pressure, etc.). Each server can load its section, then signal completion to the client via the reply handle in the proxy. The reply handle could be the handle of a threshold semaphore; e.g., semT in the case of SMX®. When all servers have replied, the client, which retained the real message, could send it to another exchange, from which it can be sent to an external device (e.g. a host computer on the LAN.) Each server can then release its proxy back to the MCB pool, after it completes use of the proxy. This example illustrates one way in which a single client task can assemble messages with different kinds of data and with different headers for different protocols.

It is also contemplated that multicasting can be used for information distribution, like broadcasting. One advantage is that it is more selective, and multicast messages can build up at a normal or pass exchange and be handled in priority order just like real messages. In this case an interlock is necessary so the multicast task does not release the message before all viewers have seen it. This can be accomplished by signaling a threshold semaphore specified in the proxy's reply field.

Proxy messages are a product of the ability to make messages from message body pointers. One importance of this approach is that it can provide a means to distribute information to multiple viewers without actually duplicating the information; it can also allow assembling of information from multiple servers for passing on in a no-copy manner, while release of the real message back to its correct pool would still be assured.

Message migration, broadcasting, and proxy messages offer more efficient ways to structure I/O and the assembly and dissemination of information within multitasking systems.

Figure 3:
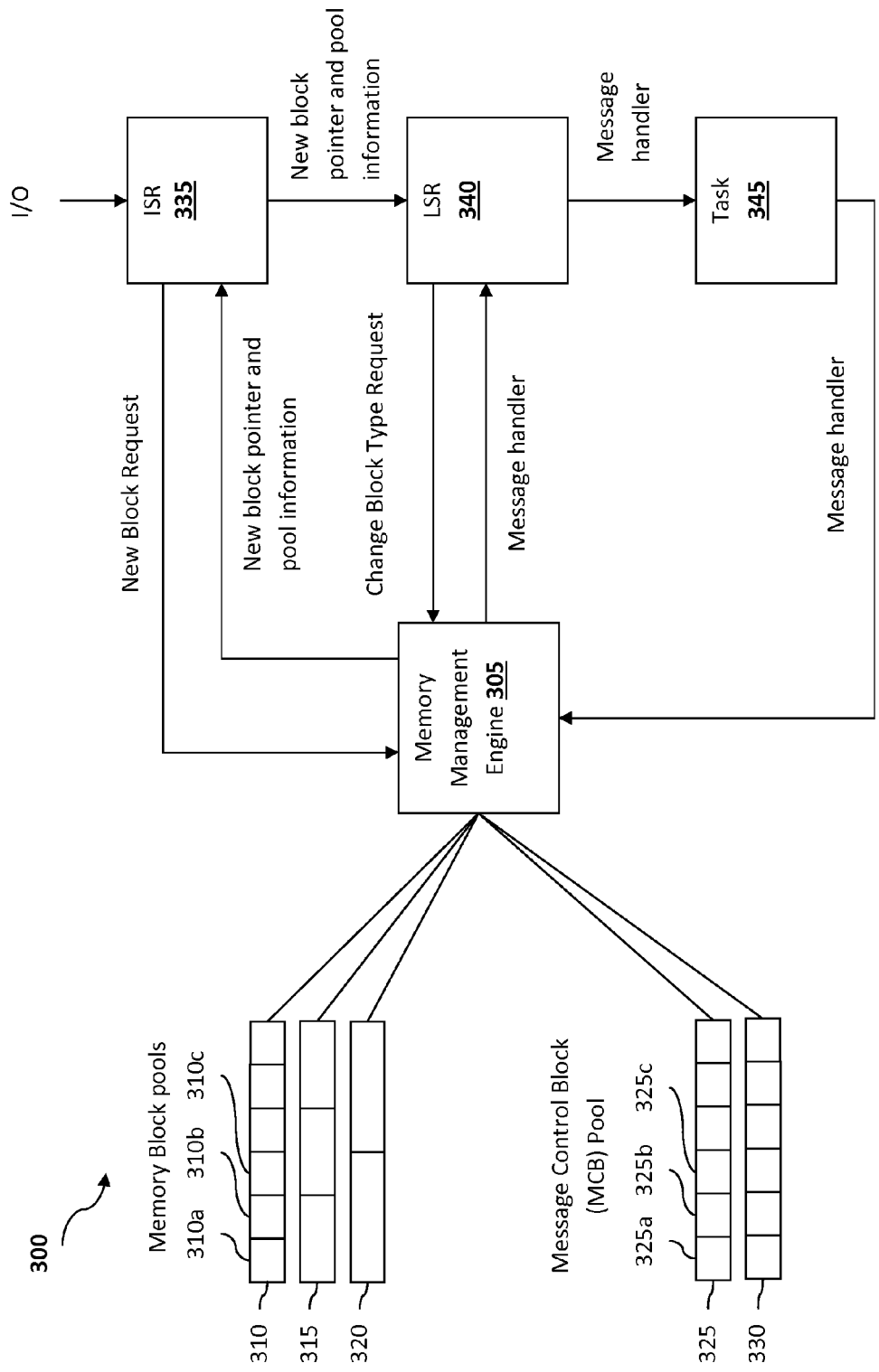
FIG. 3 shows another embodiment of the present invention for allocating and deallocating memory.

FIG. 3 illustrates a more specific embodiment of the inventive subject matter that aligns with the overall system of FIG. 1. When an interrupt is received by system 300 of the inventive subject matter, interrupt service routine (ISR) 335 can send a memory allocation request to memory management engine 305. Memory management engine 305 can retrieve a pointer and pool information associated with a suitable memory block (e.g., 310a, 310b, 310c, etc.) from a first memory storing a plurality of memory block pools (e.g., 310, 315, 320, etc.) based on the memory requirements specified in the memory allocation request. The memory management engine 305 can then send the pointer and pool information to ISR 335. ISR 335 can fill the memory block associated with the received pointer and pool information (e.g., 310a, etc.) with incoming data, and pass the pointer and pool information of memory block 310a to link service routine (LSR) 340. LSR 340 can send a block migration request to memory management engine 305 in order to migrate the memory block 310a from a bare block type to a message control block type (or other block type) as described above. For example, in order to change memory block 310a into message, memory block 310a can be linked to or combined with a MCB. When a block migration request is received by memory management engine 305, the memory management engine 305 can link memory block 310a with a MCB (e.g., 325a, 325b, 325c, etc. of MCB pools 325, 330, etc.), which can include metadata that indicates the address of the memory block and information about the memory pool from which the memory block was allocated. Viewed from a different perspective, memory management engine 305 can retrieve a handle that is associated with a message control block 325a from MCB pool 325, and send the handle to LSR 340. LSR 340 can then send the message handle to task 345, for example, upon receiving a request. It should be appreciated that task 345 can process the data in memory block 310a, or can send the handle to a memory block on to other tasks for further processing. Additionally or alternatively, an exchange can broadcast the message to many tasks, or could multicast proxies of a message to other tasks as further described below.

Task 345 releases the message handle to memory management engine 305 via a memory de-allocation request, and memory management engine 305 can de-allocate memory block 310a back to memory block pool 310, and de-allocate message control block 325a back to message control block pool 325.

One should appreciate that in the above example an incoming packet or datagram can be processed in a no-copy manner with each layer of the operating system or protocol stack being isolated from other layers and each layer lacks knowledge relating to exactly from where the packet originated.

Figure 4:
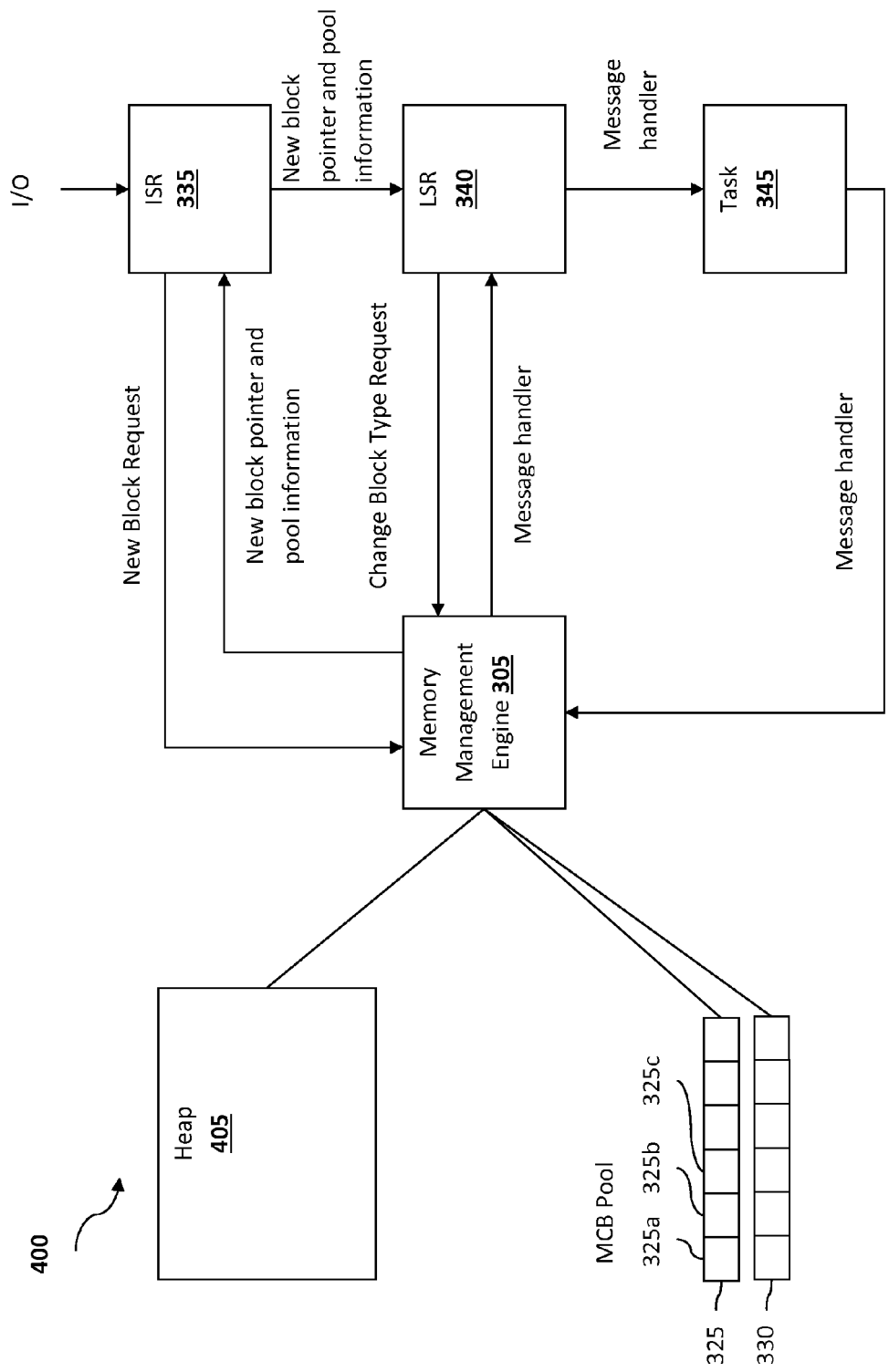
FIG. 4 shows another embodiment of the present invention for allocating and deallocating memory by using a block coming from a heap.

One important aspect of some systems of the inventive subject matter is that they can accept memory blocks from any suitable source and releases them appropriately. For example, FIG. 4 shows system 400 wherein memory management engine 305 obtains and returns memory blocks from and to heap pool 405. Unlike memory pools, the heap pool 405 includes basic memory blocks that have different sizes. In the case of a heap block a subsequent memory block de-allocation call (e.g., a HeapFree call) can be used to return the block to the heap. In this case, no pool information is required to properly allocate/de-allocate memory block, the pool field in the message control block includes the heap identification information (in the case when there are multiple heaps).

An extension of this invention is that a heap can be assigned to a message control block, and memory blocks can be obtained from the heap with a slightly different code than if they were obtained from a base block pool. For example, when a process sends to the memory manamgement engine 305 a get memory call (e.g., a MsgGet call) that includes a handle of the heap 405 and a block size, the memory management engine 305 would allocate and instantiate a data block from the heap 405, and then combine the data block with a message control block in the same manner as described above. The memory management engine 305 then returns a pointer to the MCB as the message handle. At a later point when the process requires a release of the memory block (e.g., via a block release call, a message release call, etc.), the memory management engine 305 would release the message control block to its message control block pool (e.g., pool 325 or 330) and free the data block to the heap 405. This can be extended to multiple heaps within the same system, just as there are multiple block pools.

Figure 5:
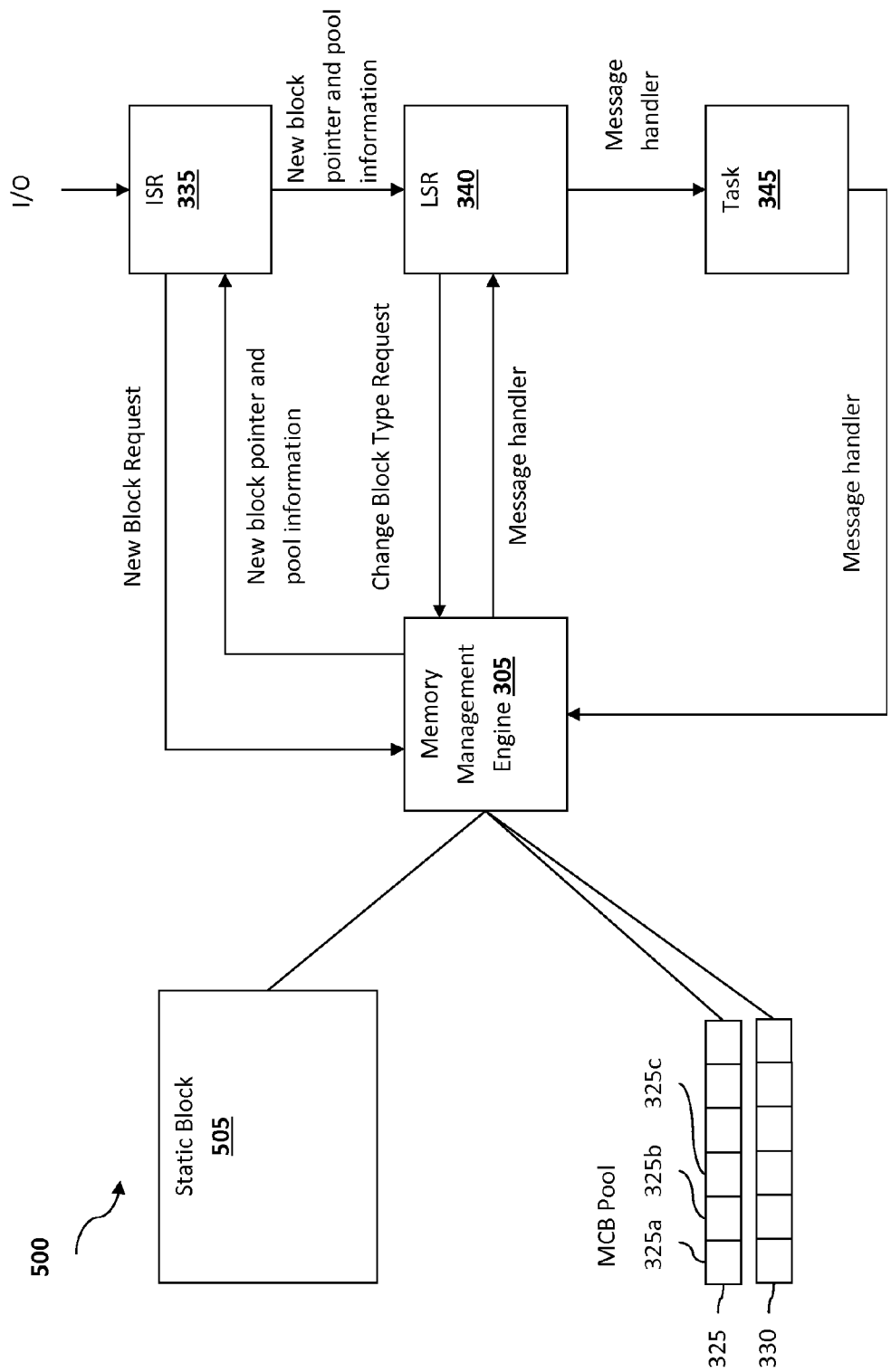
FIG. 5 shows another embodiment of the present invention for allocating and deallocating memory for a static block.

FIG. 5 shows another system 500 wherein memory management engine 305 obtains and returns memory blocks from and to static block 505.

Figure 6:
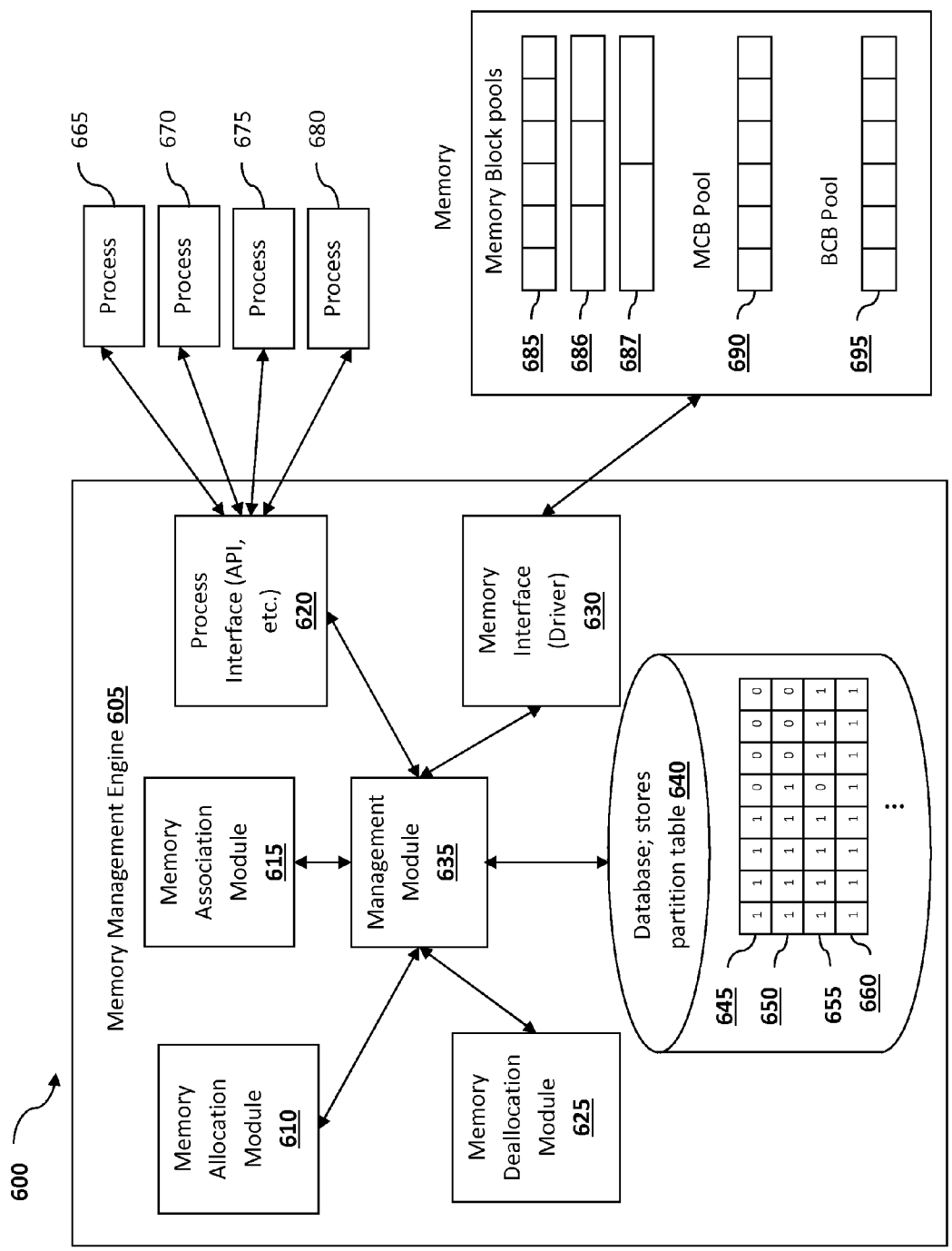
FIG. 6 shows a software architecture of a memory management system of the inventive subject matter.

FIG. 6 shows the architecture of a memory management system 600 of the inventive subject matter. Memory management engine 605 includes memory allocation module 610, memory interface (driver) 630, process interface 620, memory association module 615, memory deallocation module 625, and a database storing a partition table 640, and is programmed to allocate, migrate, and reliably release a memory block from and to its pool of origin. The partition table 640 stores information about how the physical memory are being partitioned, pool information and memory block information. For each memory block from the pools (e.g., pools 685, 686, 687), the partition table 640 stores a pointer to the memory block and information about whether the memory block is free (available) or allocated (not available).

As illustrated, memory management module 635 receives a request from process 665 via process interface 620. Memory allocation module 615, which is communicatively coupled to management module 635, uses the partition table 640 to determine a memory block that is free and available to be allocated for process 665. The memory allocation module 615 then retrieves a pointer to the memory block and pool information of the memory pool to which the memory block belongs. The memory allocation module 615 can allocate memory in different types. For example, a memory block can be allocated from memory block pool 685 as a basic type not including any metadata associated with the block in accordance with a memory allocation request. Management module 635 can send the pointer and pool information to process 665 via process interface 620 to enable process 665 to access the allocated memory block.

Process 665 can enable other processes (e.g., process 670) to access the allocated memory block by sending the pointer and pool information to process 670 for further processing data stored in the allocated memory block. Process 670 can send a block migration request in order to change the memory block from the basic memory type to the message type or block control block type.

Once memory management module 635 receives the block migration request, memory management module 635 uses memory association module 615 to allocate a message control block from the MCB pool 690 or a block control block from the BCB pool 695, and associate the message control block or block control block to the basic memory block in the same manner as described above. Additional information regarding the use of MCBs and BCBs can be found in SMX User's Guide by Ralph Moore (Moore), dated January 2014.

The associated message control block or block control block can advantageously include metadata about the memory pool (e.g., 685, 686, 687) from which the memory block was allocated and the address of the memory block. A handle that points to the memory block's message control block or block control block can then be returned to process 670 via process interface 620 to enable process 670 to access the allocated memory block.

When process 670 has completed use of the allocated memory block (now including an associated MCB or BCB), process 670 can send the handle to various other processes (e.g., process 675, process 680) for further processing without a need to keep track of the pool of origin information. Once the last process has completed use of the allocated memory block, it can send a memory de-allocation request, and memory management engine 605 will safely de-allocate the previously allocated memory block with the information associated with the block, without relying on the processes.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A memory block and message management system comprising:
   a first memory storing a plurality of memory block pools, wherein each of the plurality of memory block pools comprises at least one memory block;
   a second memory storing a message control block pool comprising a plurality of message control blocks (MCB);
   a third memory with a plurality of designated locations;
   a fourth memory storing block and message management instructions of a block and message management module of an operating system; and
   a processor coupled with the first, second, third, and fourth memory, and programmed to execute the block and message management instructions of:
   obtaining, upon receiving a block get request from a first process, external to the block and message management module, a first type memory block from a first memory block pool of the plurality of memory block pools and a pointer to the first type memory block, wherein the first type memory block is a data block comprising one or more fields;
   transmitting the pointer to the first type memory block to the first process in response to the block get request;
   obtaining, upon receiving a message make request from a second process, external to the block and message management module, an MCB from the message control block pool; linking the MCB to the first type of memory block to create a second type memory block, wherein the second type memory block is a message being transmitted to a message exchange;
   updating MCB metadata of the second type memory block. wherein the MCB metadata comprises at least a data block pointer, a data block pool pointer, a message pointer, and a message owner;
   transmitting a handle, to the second process in response to the message make request, wherein the handle is a pointer to the MCB, and
   if multiple message make requests are received for the same data block, multiple MCBs are obtained and linked to the data block; a different handle is returned each time an MCB is linked, and the multiple MCBs become proxy messages sharing the same data block;
   releasing, upon receiving a message release request from a third process, external to the block and message management module, the first type memory block to the first memory block pool and the MCB to the message control block pool according to information stored within the MCB or only the MCB to the message control block pool in the case of a proxy message;
   creating, upon receiving a message create request from a fourth process, external to the block and message management module, the second type memory block by obtaining a first type of memory block from the first memory block pool and an MCB from the MCB pool, wherein the MCB contains a pointer to the first memory block pool;
   transmitting a handle, which is a pointer to the MCB, to the fourth process in response to the message create request;
   unmaking, upon receiving a message unmake request from a fifth process, external to the block and message management module, the second type memory block by saving the pointer to the first memory block and the pointer to the first memory block pool in designated locations and releasing the MCB of the second type memory block to the MCB pool;
   releasing, upon receiving a block releasing request from a sixth process, external to the block and message management module, the first memory block back to the first memory block pool, using the information saved in the designated locations by the message unmake service.

2. The system of claim 1, wherein the operating system comprises a real-time operating system.

3. The system of claim 1, wherein the processor issues a message send request using the returned message handle to send the message to the message exchange, the processor issues a message receive request to receive the message handle from the message exchange, and the processor issues a message release request to release the first type memory block back to the first memory block pool, if the first type memory block came from a pool, or otherwise to no pool; and release the MCB back to the MCB pool.

4. The system of claim 3, wherein the message exchange comprises a message queue and a task queue wherein messages are configured to wait for tasks and tasks are configured to wait for messages, and the message exchange comprises the following modes of operation: normal, priority pass, and broadcast.

5. The system of claim 1, wherein the processor further issues multiple message send requests from a master task, in order to multicast proxy messages to multiple message exchanges; and issues a message receive request, from each of a plurality of slave tasks, in order to receive the proxy message from the message exchange used by the slave task for processing the whole proxy message or part of the proxy message.

6. The system of claim 1, wherein the processor issues a message send request to send a message from a master task to a broadcast message exchange, issues a message receive request from each of a plurality of a plurality of slave tasks to obtain access to the message from the broadcast message exchange, or issues any other message management request from the master task.

7. The system of claim 5, wherein the processor issues a message unmake request from each of the plurality of slave tasks to release the proxy message by releasing the MCB back to the MCB pool.

8. The system of claim 5, wherein the data block pointer of the message points to the start of the shared data block.

9. The system of claim 5, wherein the data block pointer of the message points to a field in the shared data block.

* * * * *